United States Patent
Segawa et al.

(10) Patent No.: US 7,873,268 B2
(45) Date of Patent: Jan. 18, 2011

(54) FOCUS ADJUSTING APPARATUS AND METHOD

(75) Inventors: Eigo Segawa, Kawasaki (JP); Morito Shiohara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 17 days.

(21) Appl. No.: 12/458,025

(22) Filed: Jun. 29, 2009

(65) Prior Publication Data
US 2010/0054723 A1    Mar. 4, 2010

(30) Foreign Application Priority Data
Sep. 4, 2008    (JP) .............................. 2008-227516

(51) Int. Cl.
*H04N 9/47* (2006.01)
*G03B 3/10* (2006.01)

(52) U.S. Cl. ................. 396/121; 348/148; 348/149; 348/155

(58) Field of Classification Search ............... 396/121, 396/128, 125; 348/148, 149, 355, 352, 353
See application file for complete search history.

(56) References Cited

U.S. PATENT DOCUMENTS

| | | | | |
|---|---|---|---|---|
| 5,179,407 A | * | 1/1993 | Kusaka et al. ............... | 396/93 |
| 5,555,068 A | * | 9/1996 | Utagawa ...................... | 396/121 |
| 5,999,877 A | * | 12/1999 | Takahashi et al. ............ | 701/117 |
| 6,538,579 B1 | * | 3/2003 | Yoshikawa et al. .......... | 340/928 |
| 7,561,790 B2 | * | 7/2009 | Yata ............................ | 396/124 |
| 2007/0009249 A1 | * | 1/2007 | Kim ............................. | 396/121 |

FOREIGN PATENT DOCUMENTS

| | | |
|---|---|---|
| EP | 2 037 321 A1 | 3/2009 |
| JP | 4-169987 | 6/1992 |
| JP | 7-92381 | 4/1995 |
| JP | 2000-322686 | 11/2000 |
| JP | 2007-104248 | 4/2007 |
| JP | 2007-139892 | 6/2007 |

OTHER PUBLICATIONS

European Search Report dated Dec. 21, 2009 and issued in corresponding European Patent Application 09008383.3.

* cited by examiner

*Primary Examiner*—W. B. Perkey
*Assistant Examiner*—Noam Reisner
(74) *Attorney, Agent, or Firm*—Staas & Halsey LLP

(57) ABSTRACT

A focus adjusting apparatus adjusts a focus of a camera imaging a moving object. The apparatus includes a calculating unit that calculates a first out-of-focus level of a portion corresponding to the moving object within a first region of an image picked up by the camera, and calculates a second out-of-focus level of a portion corresponding to the moving object within a second region of an image; and a focus adjusting unit that shifts the focus of the camera in a direction in which the camera is focused onto the portion corresponding to the moving object within the first region when the first out-of-focus level is larger than the second out-of-focus level, and that shifts the focus in a direction in which the camera is focused onto the portion corresponding to the moving object within the second region when the second out-of-focus level is larger than the first out-of-focus level.

7 Claims, 7 Drawing Sheets

FOCUS ADJUSTING APPARATUS AND METHOD

CROSS-REFERENCE TO RELATED APPLICATION(S)

This application is based upon and claims the benefit of priority of the prior Japanese Patent Application No. 2008-227516, filed on Sep. 4, 2008, the entire contents of which are incorporated herein by reference.

FIELD

The embodiments are discussed herein are directed to a focus adjusting apparatus and a focus adjusting method for adjusting the focus of a camera imaging a moving object.

BACKGROUND

Conventionally, in some cases, a moving object moving on a plane such as a road is imaged at a predetermined depression angle, by a camera set above the plane. An image processing device is sometimes used to recognize a specific pattern of the moving object within an image picked up by the camera, thereby obtaining information of the pattern. In this image recognition, it is important that the moving object on the image is clear to make it possible to sufficiently obtain information of the pattern.

A technique can be used to enable to automatically focus a camera onto a moving object. For example, a technique is known that enables to image a moving object at plural times each time the moving object passes within an imaging range, and estimate a motion of the moving object based on a change of an out-of-focus level of the moving object within each image, thereby adjusting the focus onto the moving object (see Japanese Laid-open Patent Publication No. 07-92381).

However, in the conventional technique described above, a lens is focused onto the moving object each time. Therefore, the focus is sometimes deviated far from the moving object because of a wrong estimation. In such cases, the camera cannot be focused onto the moving object.

SUMMARY

According to an aspect of the invention, a focus adjusting apparatus adjusts a focus of a camera imaging a moving object. The apparatus includes a calculating unit that calculates a first out-of-focus level of a portion corresponding to the moving object within a first region of an image picked up by the camera, and calculates a second out-of-focus level of a portion corresponding to the moving object within a second region of an image picked up by the camera; and a focus adjusting unit that shifts the focus of the camera in a direction in which the camera is focused onto the portion corresponding to the moving object within the first region when the first out-of-focus level calculated by the calculating unit is larger than the second out-of-focus level calculated by the calculating unit, and that shifts the focus of the camera in a direction in which the camera is focused onto the portion corresponding to the moving object within the second region when the second out-of-focus level is larger than the first out-of-focus level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Preferred embodiments of a focus adjusting apparatus and a focus adjusting method according to the present embodiment will be explained in detail below with reference to the accompanying drawings.

Figure 1:
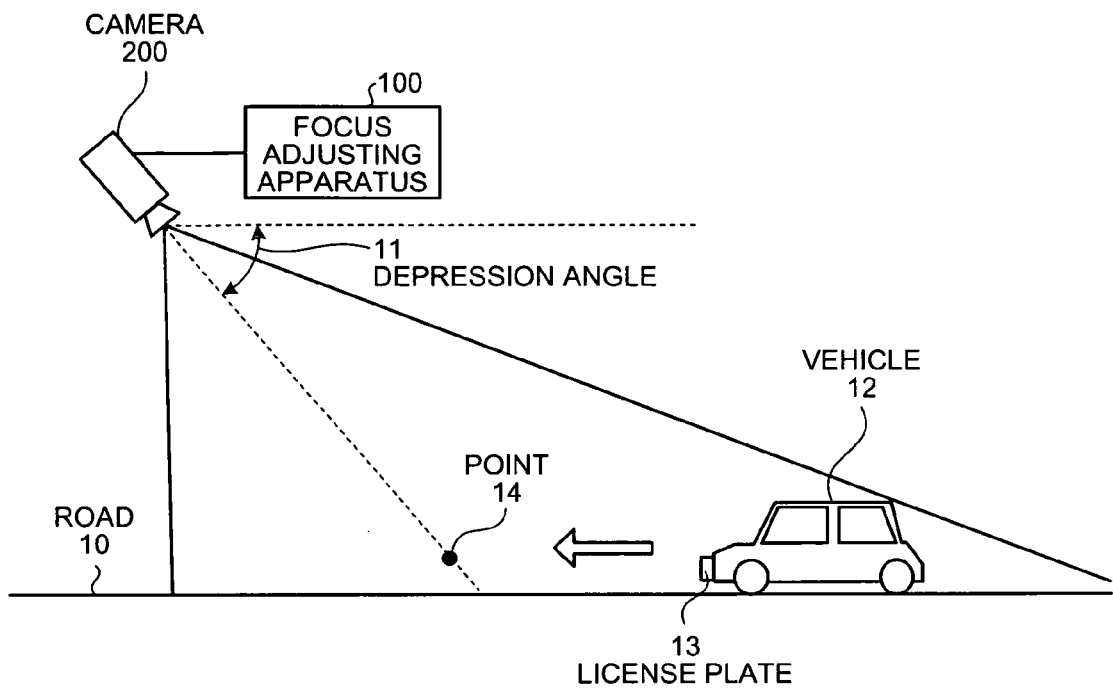
FIG. 1 is a schematic diagram for explaining an outline of a focus adjusting apparatus according to an embodiment of the present invention.
Figure 2:
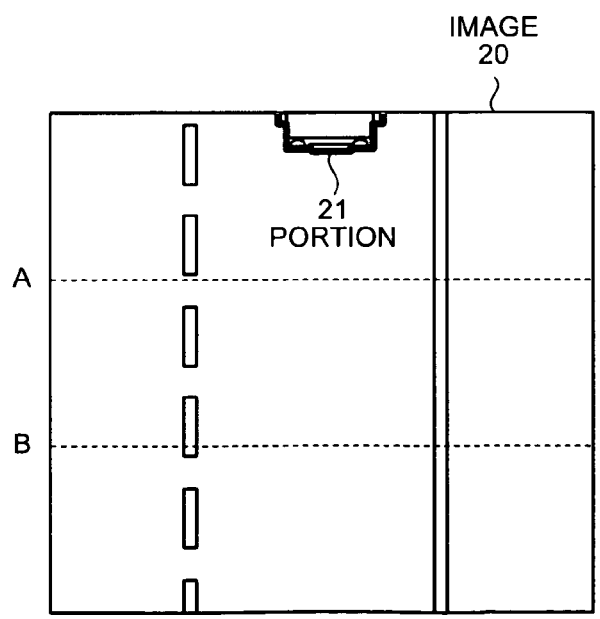
FIG. 2 depicts images picked up by a camera.
Figure 3:
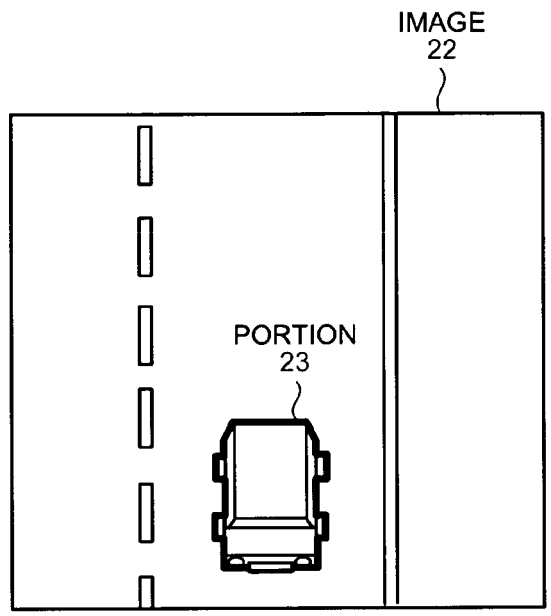
FIG. 3 depicts images picked up by a camera.

An outline of a focus adjusting apparatus according to one embodiment of the present invention is explained first with reference to FIGS. 1 to 3. FIG. 1 is a schematic diagram for explaining the outline of the focus adjusting apparatus according to the present embodiment. As depicted in FIG. 1, this embodiment assumes a case in which a camera 200 fixed above a road 10 images at a predetermined depression angle 11, a vehicle 12 running on the road 10 in a direction of an arrow. FIGS. 2 and 3 depict images picked up by the camera 200.

There is a technique that enables to use an image processing device (not depicted) that recognizes a portion corresponding to a license plate 13 of the vehicle 12 within an image picked up by the camera 200, and obtains information concerning characters described in the license plate 13 of the vehicle 12. To obtain information concerning the characters by the image recognition, it is important that the camera 200 clearly images the vehicle 12. For this purpose, it is preferable to focus the camera 200 onto one point and cause the camera 200 to pick up images in focus of at least the vehicle passing through near this point.

A focus adjusting apparatus 100 can adjust the focus of the camera 200 to enable to image a vehicle within a range of a certain distance from the camera 200 (for example, a vehicle seen between A and B within an image 20 in FIG. 2) in sharpness necessary to recognize the image even when the focus of the camera 200 roughly set at the beginning. Specifically, the focus adjusting apparatus 100 obtains the image 20 and an image 22 picked up by the camera 200 as depicted in FIGS. 2 and 3. A portion 21 in an upper part of the image 20 corresponds to the vehicle 12. A portion 23 in a lower part of the image 22 corresponds to the vehicle 12. The focus adjusting apparatus 100 calculates an out-of-focus level of the portion 21 within the image 20 and an out-of-focus level of the portion 23 within the image 22 based on contrast and a high-frequency component of each of the portions. When the out-of-focus level of the portion 21 is larger than the out-of-focus level of the portion 23, the focus adjusting apparatus 100 shifts the focus of the camera 200 in a direction away from the camera 200 so that the focus is adjusted onto the portion 21. On the other hand, when the out-of-focus level of the portion 23 is larger than the out-of-focus level of the portion 21, the focus adjusting apparatus 100 shifts the focus of the camera 200 in a direction toward the camera 200 so that the focus is adjusted onto the portion 23.

The focus adjusting apparatus 100 also obtains images of other vehicles passing through an imaging range of the camera 200 so that the images include portions corresponding to these vehicles in an upper part of the image and in a lower part of the image like the images 20 and 22, and adjusts the focus of the camera 200 in the above-described process. As a result, the focus of the camera 200 is adjusted so that the out-of-focus levels of the vehicles from the upper part of the image to the lower part of the image become equal to or lower than a predetermined value. That is, the focus adjusting apparatus 100 according to the present embodiment can focus the camera 200 on the vehicles.

Even when the vehicle 12 running on the road 10 in an opposite direction to that indicated by the arrow in FIG. 1 is imaged by the camera 200 in a different assumption from that of the present embodiment, the focus adjusting apparatus 100 can also adjust the focus of the camera 200 in a similar manner.

Figure 4:
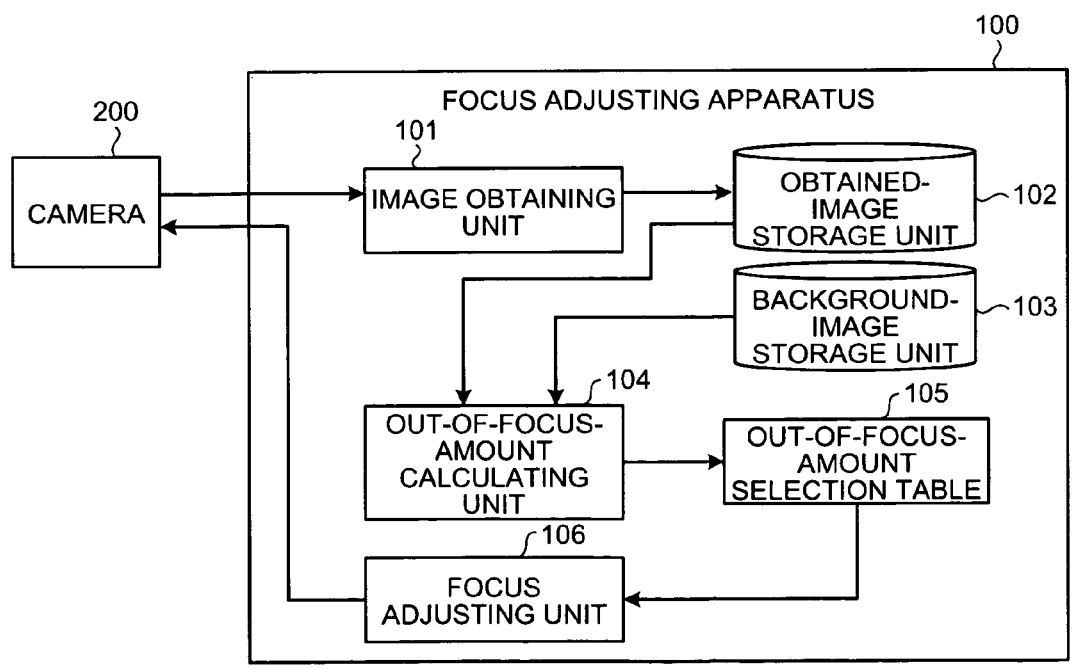
FIG. 4 is a block diagram of a configuration of the focus adjusting apparatus.

A configuration of the focus adjusting apparatus 100 is explained next. FIG. 4 is a block diagram of the configuration of the focus adjusting apparatus 100 according to the present embodiment. As depicted in FIG. 4, the focus adjusting apparatus 100 includes an image obtaining unit 101, an obtained-image storage unit 102, a background-image storage unit 103, an out-of-focus-amount calculating unit 104, an out-of-focus-amount selection table 105, and a focus adjusting unit 106.

The image obtaining unit 101 obtains images picked up by the camera 200 at predetermined time intervals, and stores the obtained images into the obtained-image storage unit 102. The obtained-image storage unit 102 stores therein the images obtained by the image obtaining unit 101. The background-image storage unit 103 stores therein a background image previously picked up by the camera 200 while no vehicle is running through the imaging range of the camera 200.

Figure 5:
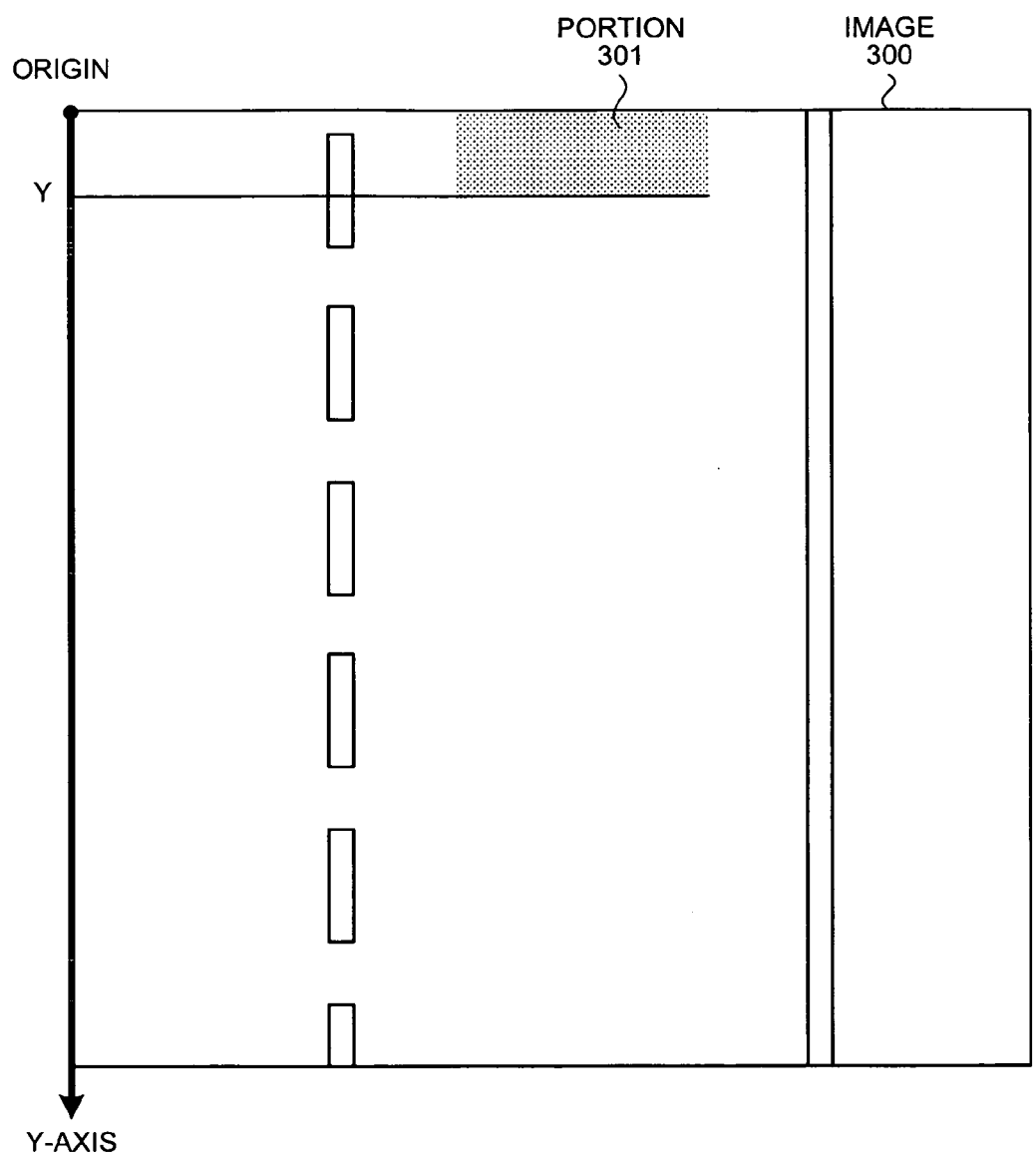
FIG. 5 is a schematic diagram for explaining determination of a position of a Y-axis performed by an out-of-focus-amount calculating unit.

The out-of-focus-amount calculating unit 104 calculates a difference between the image stored in the obtained-image storage unit 102 and the background image stored in the background-image storage unit 103. As a result, the difference is detected in an upper portion 301 of an image 300 as depicted in FIG. 5, for example. When the difference as depicted in the portion 301 is detected, the out-of-focus-amount calculating unit 104 obtains a position "Y" of a lower end of the portion 301 on a Y-axis taking a positive value in a downward direction, with an upper left of the image 300 as an origin. The out-of-focus-amount calculating unit 104 also obtains a frequency distribution by performing a Fourier transform to the portion 301, and obtains strength of a higher frequency component than a predetermined frequency. The out-of-focus-amount calculating unit 104 calculates an out-of-focus amount as an out-of-focus level based on the obtained strength. When the strength has a smaller value, the out-of-focus amount of the portion 301 has a larger value. That is, the out-of-focus amount correlates inversely with the strength. The out-of-focus-amount calculating unit 104 registers the position and the out-of-focus amount into the out-of-focus-amount selection table 105 by relating the position and the amount to each other. The out-of-focus-amount calculating unit 104 calculates differences between all images stored in the obtained-image storage unit 102 and the background image. When the difference is detected, the out-of-focus-amount calculating unit 104 obtains a position and an out-of-focus amount, and stores the obtained position and the obtained out-of-focus amount into the out-of-focus-amount selection table 105. Because a vehicle moves from the upper part toward the lower part within the image 300, an out-of-focus amount "B1" related to a position of a value "Y1" near to the origin 0 is first registered into the out-of-focus-amount selection table 105, for example. An out-of-focus amount "B2" related to a position of a value "Y2" larger than the value "Y1" is then registered into the out-of-focus-amount selection table 105. An out-of-focus amount "B3" related to a position of a value "Y3" larger than the value "Y2" is further registered into the out-of-focus-amount selection table 105. The values obtained for the portion 301 can be any values so long as out-of-focus amounts as out-of-focus levels of the portion 301 can be calculated based on these values. For example, edges of the portion 301 can be obtained by a sobel filter, and a sum of edge strengths can be obtained as these values. Alternatively, contrast of the portion 301 can be used.

Figure 6:
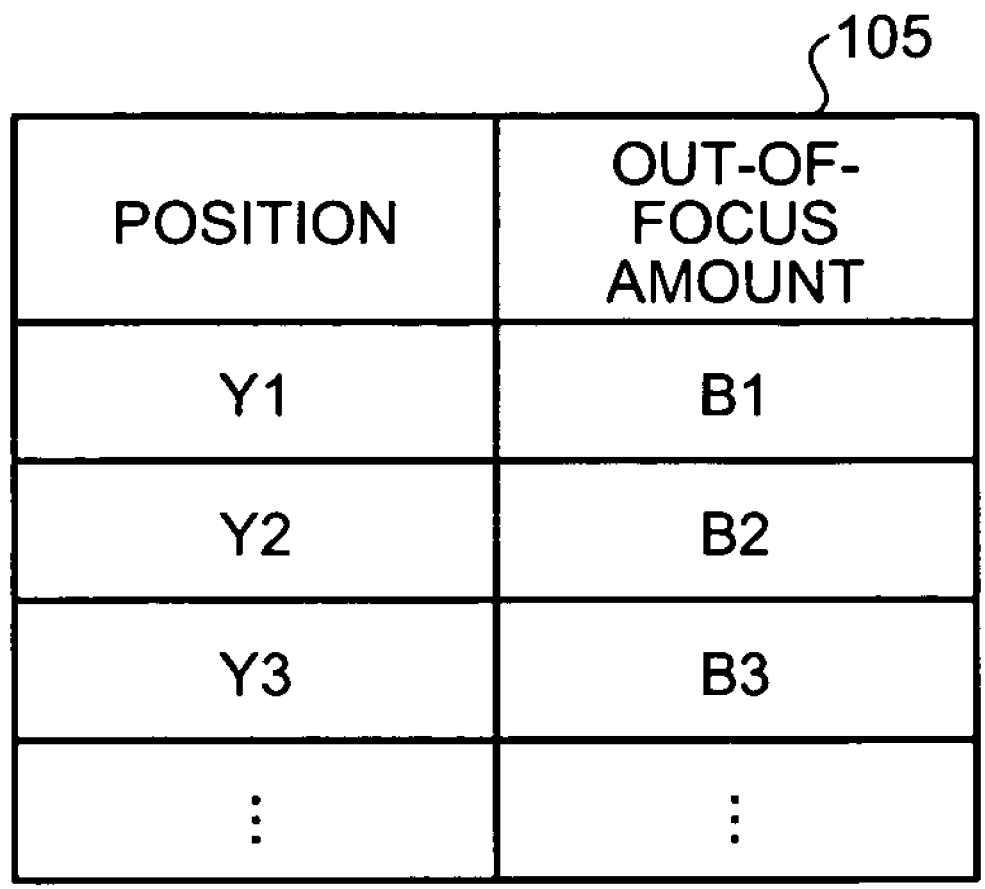
FIG. 6 is a specific example of an out-of-focus-amount selection table.

The out-of-focus-amount selection table 105 is registered with the positions and the out-of-focus amounts obtained by the out-of-focus-amount calculating unit 104. Specifically, as depicted in FIG. 6, a relationship between the positions and the out-of-focus amounts are registered into the out-of-focus-amount selection table 105.

Figure 7:
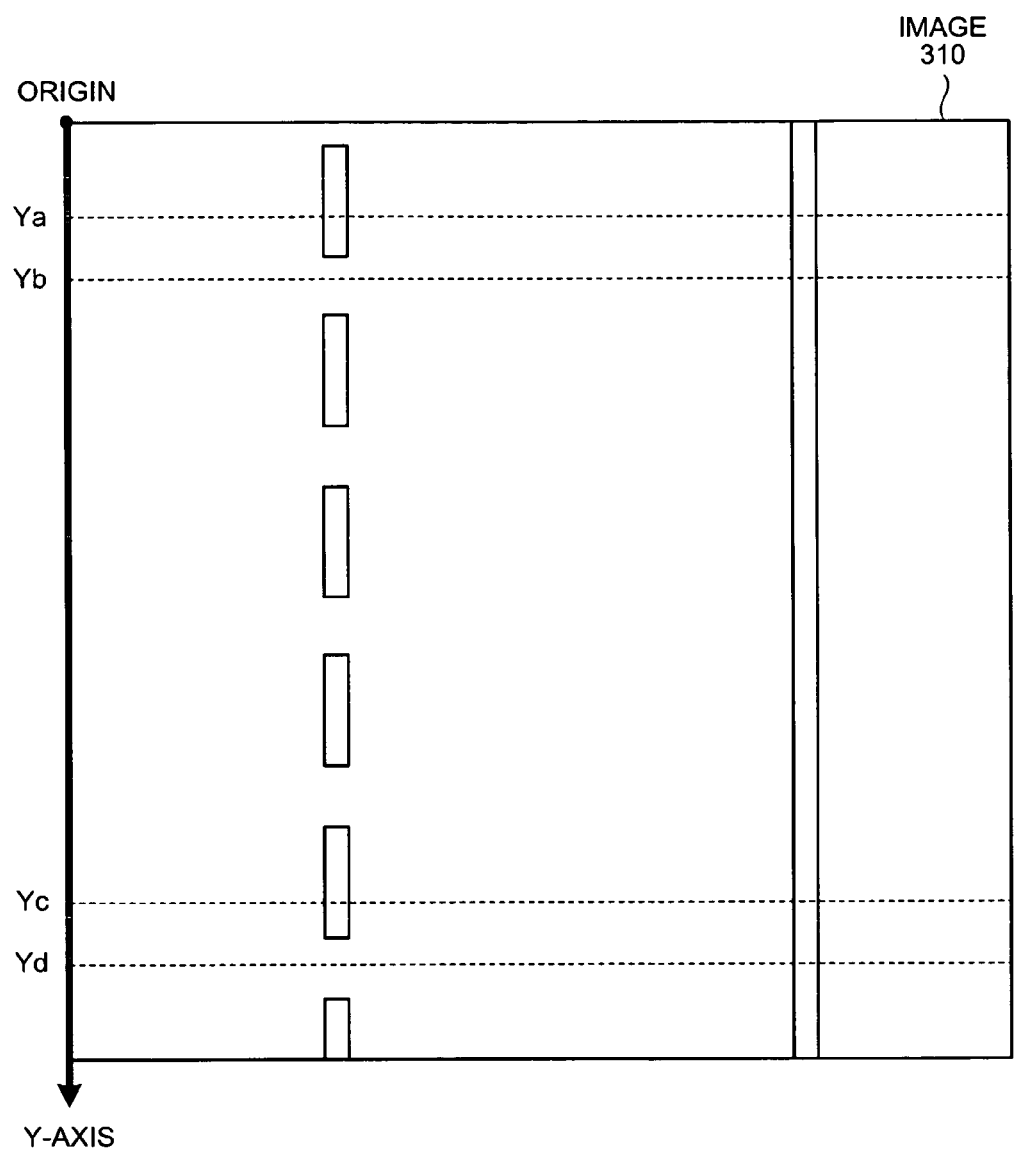
FIG. 7 is a schematic diagram for explaining an out-of-focus-amount selecting process performed by a focus adjusting unit.

The focus adjusting unit 106 sets two ranges in advance. When an out-of-focus amount related to a position within one of the two ranges is registered into the out-of-focus-amount selection table 105, the focus adjusting unit 106 selects this out-of-focus amount. When an out-of-focus amount related to a position within the other of the two ranges is registered into the out-of-focus-amount selection table 105, the focus adjusting unit 106 selects this out-of-focus amount. The focus adjusting unit 106 determines whether the selected two out-of-focus amounts are smaller than a predetermined value. Specifically, as depicted in FIG. 7, the focus adjusting unit 106 sets one range by a combination of two positions "Ya" and "Yb" located near the origin at the upper left of an image 310. The other range is set by a combination of two positions "Yc" and "Yd" located far from the origin. That is, when an out-of-focus amount "Bs" related to a position equal to or higher than Ya and equal to or lower than Yb is registered into the out-of-focus-amount selection table 105, the focus adjusting unit 106 selects the out-of-focus amount "Bs". When an out-of-focus amount "Be" related to a position equal to or higher than Yc and equal to or lower than Yd is then registered into the out-of-focus-amount selection table 105, the focus adjusting unit 106 selects the out-of-focus amount "Be". The focus adjusting unit 106 then determines whether both the out-of-focus amounts "Bs" and "Be" are smaller than a predetermined value. The predetermined value is set in advance in the focus adjusting unit 106. When the out-of-focus amount does not exceed the predetermined value, information concerning characters can be sufficiently obtained when the image recognition is performed to each of the portions.

As a result of the determination, when either one of the out-of-focus amounts "Bs" and "Be" is larger than the predetermined value, or when both the out-of-focus amounts "Bs" and "Be" are larger than the predetermined value, the focus adjusting unit 106 compares the out-of-focus amount "Bs" and the out-of-focus amount "Be", and adjusts the focus of the camera 200 based on a result of the comparison. The fact that the out-of-focus amount "Bs" is larger than the out-of-focus amount "Be" means that a portion detected as a vehicle in the upper part of the image has a larger out-of-focus level than that of a portion detected as a vehicle in the lower part of the image. That is, in FIG. 1, this means that the camera 200 is focused on a position which is nearer the camera 200 than a point 14. On the other hand, the fact that the out-of-focus amount "Be" is larger than the out-of-focus amount "Bs" means that a portion detected as a vehicle in the lower part of the image has a larger out-of-focus level than that of a portion detected as a vehicle in the upper part of the image. That is, in FIG. 1, this means that the camera 200 is focused on a position which is farther than the point 14 from the camera 200. Therefore, when the out-of-focus amount "Bs" is larger than the out-of-focus amount "Be", the focus adjusting unit 106 outputs a control signal to the camera 200 to instruct the camera 200 to shift the focus in a direction away from the camera 200. On the other hand, when the out-of-focus amount "Be" is larger than the out-of-focus amount "Bs", the focus adjusting unit 106 outputs a control signal to the camera 200 to instruct the camera 200 to shift the focus in a direction toward the camera 200. Thereafter, the focus adjusting unit 106 similarly selects the other two out-of-focus amounts from the out-of-focus-amount selection table 105. When either one of the selected two out-of-focus amounts is larger than the predetermined value, or when both the two out-of-focus amounts are larger than the predetermined value, the focus adjusting unit 106 compares the two out-of-focus amounts. The focus adjusting unit 106 adjusts the focus of the camera 200 based on a result of the comparison. With this arrangement, the focus of the camera 200 is adjusted onto near one point. Consequently, the camera 200 can be focused onto at least a vehicle passing through near this point.

On the other hand, as a result of the determination, when both the out-of-focus amounts "Bs" and "Be" are smaller than the predetermined value, the focus adjusting unit 106 selects out-of-focus amounts of another vehicle passing through the imaging range of the camera 200 and performs a similar determination, because the out-of-focus amount "Bs" related to the position equal to or higher than Ya and equal to or lower than Yb and the out-of-focus amount "Be" related to the position equal to or higher than Yc and equal to or lower than Yd are registered again into the out-of-focus-amount selection table 105. As explained above, only when none of the out-of-focus amounts "Bs" and "Be" is smaller than the predetermined value, the focus adjusting unit 106 compares the out-of-focus amounts "Bs" and "Be", and adjusts the focus of the camera 200. Therefore, the focus can be kept onto one point.

Figure 8:
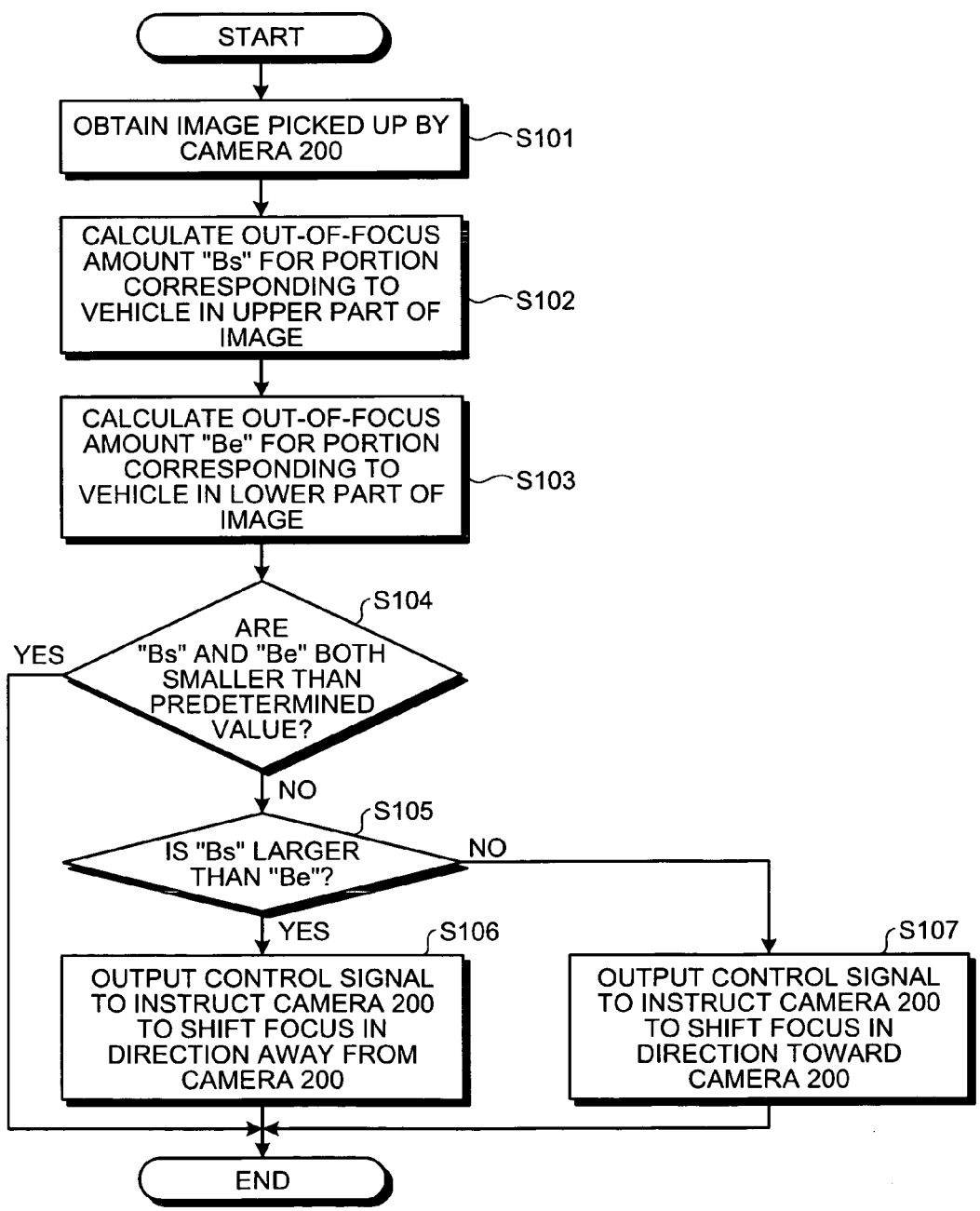
FIG. 8 is a flowchart of a process performed by the focus adjusting apparatus.

A flow of a process performed by the focus adjusting apparatus 100 is explained next. FIG. 8 is a flowchart of the process performed by the focus adjusting apparatus 100. The process flow depicted in FIG. 8 is repeatedly performed during the operation of the focus adjusting apparatus 100.

As depicted in FIG. 8, in the focus adjusting apparatus 100, the image obtaining unit 101 first obtains an image picked up by the camera 200 (Step S101). The out-of-focus-amount calculating unit 104 calculates the out-of-focus-amount "Bs" based on high-frequency components higher than a predetermined frequency for a portion corresponding to a vehicle in the upper part of the image (Step S102). The out-of-focus-amount calculating unit 104 further calculates the out-of-focus-amount "Be" based on high-frequency components higher than the predetermined frequency for a portion corresponding to the vehicle in the lower part of the image (Step S103).

When either one of the out-of-focus amounts "Bs" and "Be" is larger than the predetermined value, or when both the out-of-focus amounts "Bs" and "Be" are larger than the predetermined value (No at Step S104), and also when the out-of-focus amount "Bs" is larger than the out-of-focus amount "Be" (Yes at Step S105), the focus adjusting unit 106 outputs a control signal to the camera 200 to instruct the camera 200 to shift the focus in a direction away from the camera 200 (Step S106), and finishes the process.

On the other hand, when either one of the out-of-focus amounts "Bs" and "Be" is larger than the predetermined value, or when both the out-of-focus amounts "Bs" and "Be" are larger than the predetermined value (No at Step S104), and also when the out-of-focus amount "Be" is larger than the out-of-focus amount "Bs" (No at Step S105), the focus adjusting unit 106 outputs a control signal to the camera 200 to instruct the camera 200 to shift the focus in a direction toward the camera 200 (Step S107), and finishes the process.

As described above, the focus adjusting apparatus 100 according to the present embodiment adjusts the focus of the camera 200 based on the out-of-focus amounts of portions corresponding to a vehicle within two images, each time when the vehicle passes through the imaging range of the camera 200. By repeatedly adjusting the focus, the focus adjusting apparatus 100 can focus the camera 200 onto near one point within the imaging range. That is, the focus adjusting apparatus 100 can focus the camera 200 onto at least a vehicle passing through near the point 14.

The configuration of the focus adjusting apparatus 100 according to the present embodiment depicted in FIG. 2 can be variously modified without departing from the spirit or scope of the present invention. For example, functions of the image obtaining unit 101, the out-of-focus-amount calculating unit 104, and the focus adjusting unit 106 included in the focus adjusting apparatus 100 can be implemented as software. A central processing unit (CPU) can perform this software, thereby performing functions equivalent to the functions of the focus adjusting apparatus 100. One example of a computer that executes a focus adjusting program 431 having the functions of the image obtaining unit 101, the out-of-focus-amount calculating unit 104, and the focus adjusting unit 106 implemented as software is shown below.

Figure 9:
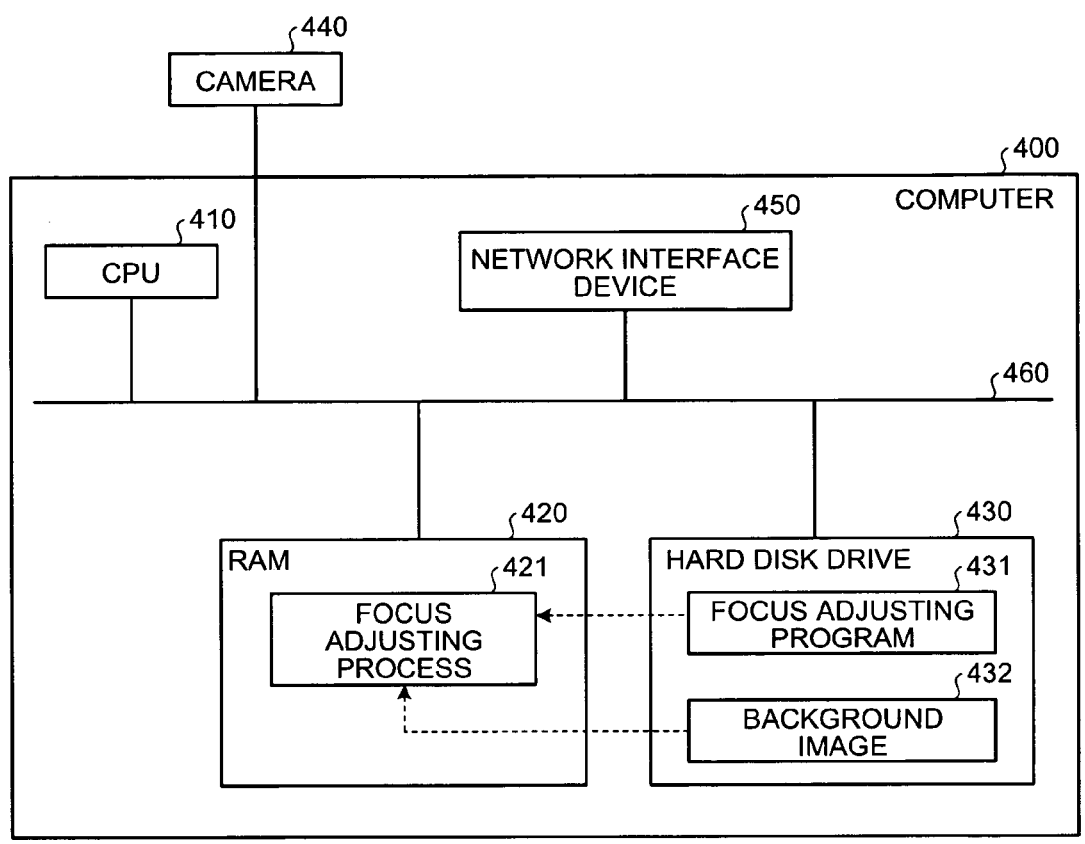
FIG. 9 depicts a computer that executes a focus adjusting program.

FIG. 9 is a functional block diagram of a computer 400 that executes the focus adjusting program 431. The computer 400 includes a CPU 410 that performs various operation processes, a random access memory (RAM) 420 that temporarily stores therein various kinds of information, a hard disk drive 430, a camera 440 that picks up an image of a vehicle, and a network interface device 450 that exchanges data with other computers via a network, which are connected to each other via a bus 460.

The hard disk drive 430 stores therein the focus adjusting program 431 having functions similar to those of the image obtaining unit 101, the out-of-focus-amount calculating unit 104, and the focus adjusting unit 106 depicted in FIG. 4. The hard disk drive 430 also includes a background image 432 corresponding to the background image stored in the background-image storage unit 103 as depicted in FIG. 4.

When the CPU 410 reads the focus adjusting program 431 from the hard disk drive 430 and develops the read program into the RAM 420, the focus adjusting program 431 functions as a focus adjusting process 421. The focus adjusting process 421 properly develops information and the like read from the background image 432, into a region allocated to the focus adjusting process 421 on the RAM 420, and performs various kinds of data processes based on the developed data and the like.

The focus adjusting program 431 is not necessarily required to be stored into the hard disk drive 430. The computer 400 can read the program stored in a storage medium such as a memory card, and can execute this program. This program can be also stored into another computer (or a server) connected to the computer 400 via a public line, the Internet, a local area network (LAN), a wide area network (WAN), or the like. The computer 400 can read this program from the another computer or the server and execute the program.

According to the embodiments, the camera can be focused onto a moving object.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A focus adjusting apparatus that adjusts a focus of a camera imaging a moving object, the focus adjusting apparatus comprising:
    a calculating unit that calculates a first out-of-focus level of a portion corresponding to the moving object within a first region of an image picked up by the camera, and calculates a second out-of-focus level of a portion corresponding to the moving object within a second region of an image picked up by the camera; and
    a focus adjusting unit that shifts the focus of the camera in a direction in which the camera is focused onto the portion corresponding to the moving object within the first region when the first out-of-focus level calculated by the calculating unit is larger than the second out-of-focus level calculated by the calculating unit, and that shifts the focus of the camera in a direction in which the camera is focused onto the portion corresponding to the moving object within the second region when the second out-of-focus level is larger than the first out-of-focus level.

2. The focus adjusting apparatus according to claim 1, wherein when both the first out-of-focus level calculated by the calculating unit and the second out-of-focus level calculated by the calculating unit are smaller than a certain reference, the focus adjusting unit adjusts the focus of the camera onto the same position as the current position.

3. The focus adjusting apparatus according to claim 1, wherein the calculating unit calculates the first out-of-focus level and the second out-of-focus level based on a high-frequency component of each of the portions corresponding to the moving object.

4. The focus adjusting apparatus according to claim 1, wherein the calculating unit calculates the first out-of-focus level and the second out-of-focus level based on contrast of each of the portions corresponding to the moving object.

5. The focus adjusting apparatus according to claim 1, wherein the calculating unit calculates the first out-of-focus level and the second out-of-focus level based on edge strength of each of the portions corresponding to the moving object.

6. A focus adjusting method of adjusting a focus of a camera imaging a moving object, the focus adjusting method comprising:
    calculating a first out-of-focus level of a portion corresponding to the moving object within a first region of an image picked up by the camera;
    calculating a second out-of-focus level of a portion corresponding to the moving object within a second region of an image picked up by the camera; and
    shifting the focus of the camera in a direction in which the camera is focused onto the portion corresponding to the moving object within the first region when the first out-of-focus level calculated in the calculating of the first out-of-focus level is larger than the second out-of-focus level calculated in the calculating of the second out-of-level, and shifting the focus of the camera in a direction in which the camera is focused onto the portion corresponding to the moving object within the second region when the second out-of-focus level is larger than the first out-of-focus level.

7. A non-transitory computer readable storage medium containing instructions for adjusting a focus of a camera imaging a moving object, wherein the instructions, when executed by a computer, causes the computer to perform:
    calculating a first out-of-focus level of a portion corresponding to the moving object within a first region of an image picked up by the camera;
    calculating a second out-of-focus level of a portion corresponding to the moving object within a second region of an image picked up by the camera; and
    shifting the focus of the camera in a direction in which the camera is focused onto the portion corresponding to the moving object within the first region when the first out-of-focus level calculated in the calculating of the first out-of-focus level is larger than the second out-of-focus level calculated in the calculating of the second out-of-level, and shifting the focus of the camera in a direction in which the camera is focused onto the portion corresponding to the moving object within the second region when the second out-of-focus level is larger than the first out-of-focus level.

* * * * *